United States Patent [19]

Pearlman

[11] Patent Number: 4,992,201

[45] Date of Patent: Feb. 12, 1991

[54] LATEX ENTRAPPED NCAP LIQUID CRYSTAL COMPOSITION, METHOD AND APPARATUS

[75] Inventor: Kenneth N. Pearlman, San Jose, Calif.

[73] Assignee: Taliq Corporation, Sunnyvale, Calif.

[21] Appl. No.: 171,135

[22] Filed: Mar. 16, 1988

Related U.S. Application Data

[63] Continuation of Ser. No. 705,209, Feb. 25, 1985, abandoned, which is a continuation-in-part of Ser. No. 591,433, Mar. 20, 1984, abandoned.

[51] Int. Cl.$^5$ ............................................. C09K 19/00
[52] U.S. Cl. ............................ 252/299.1; 252/299.01; 252/299.5; 252/299.7; 428/1; 250/350 R
[58] Field of Search ............. 252/299.01, 299.1, 299.7; 428/422.21, 422.22; 350/349, 350 R, 351

[56] References Cited

U.S. PATENT DOCUMENTS

| | | | |
|---|---|---|---|
| 3,578,844 | 2/1968 | Churchill et al. | 252/299.01 |
| 3,600,060 | 8/1971 | Churchill et al. | 252/299.7 |
| 3,617,374 | 11/1971 | Hodson et al. | 252/299.01 |
| 3,619,254 | 3/1969 | Davis | 252/299.7 |
| 3,720,623 | 3/1973 | Cartmell et al. | 252/299.5 |
| 3,852,092 | 12/1974 | Patterson et al. | 117/36.7 |
| 3,872,050 | 3/1975 | Benton et al. | 252/299.7 |
| 3,969,264 | 6/1976 | Davis | 252/299.01 |
| 4,016,098 | 4/1977 | Saeki | 252/299.7 |
| 4,022,706 | 5/1977 | Davis | 252/299.01 |
| 4,045,383 | 8/1977 | Koff | 252/299.7 |
| 4,048,358 | 9/1977 | Shanks | 350/349 |
| 4,070,912 | 1/1978 | McNaughton et al. | 252/299.7 |
| 4,161,557 | 7/1979 | Suzuki et al. | 428/1 |
| 4,301,054 | 11/1981 | Buirley et al. | 252/299.7 |
| 4,435,047 | 3/1984 | Fergason | 350/350 R |
| 4,441,508 | 4/1984 | Buirley et al. | 252/299.7 |
| 4,501,503 | 2/1985 | Buirley et al. | 252/299.7 |
| 4,556,289 | 12/1985 | Fergason | 350/350 R |
| 4,579,423 | 4/1986 | Fergason | 350/349 |
| 4,596,445 | 6/1986 | Fergason | 350/339 |
| 4,603,945 | 8/1986 | Fergason | 350/331 |
| 4,606,611 | 9/1986 | Fergason | 350/334 |
| 4,616,903 | 12/1986 | Fergason | 350/334 |
| 4,662,720 | 5/1987 | Fergason | 350/339 |
| 4,688,900 | 8/1987 | Doane et al. | 350/350 R |
| 4,707,080 | 11/1987 | Fergason | 252/299.01 |

*Primary Examiner*—John S. Maples
*Assistant Examiner*—Richard Treanor
*Attorney, Agent, or Firm*—Flehr, Hohbach, Test, Albritton & Herbert

[57] ABSTRACT

Methods for making a latex entrapped nematic curvilinearly aligned phases liquid crystal composition and apparatus utilizing such composition wherein the liquid crystal material is dispersed in a latex medium. Such a composition may be made by emulsifying liquid crystal material in the presence of a suspension of latex particles or, alternatively, by combining a suspension of latex particles with an emulsion of liquid crystal material.

31 Claims, 1 Drawing Sheet

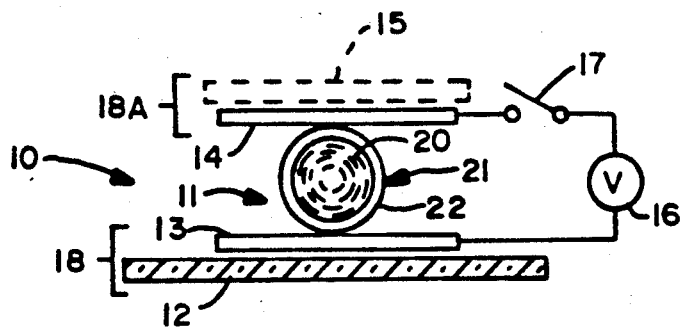
FIG.—1
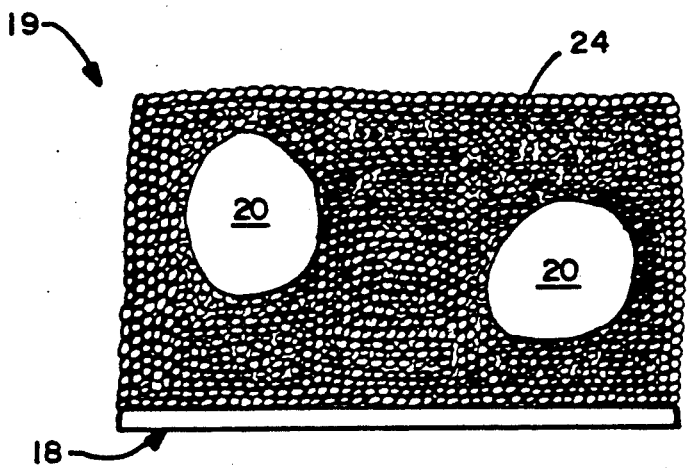
FIG.—2
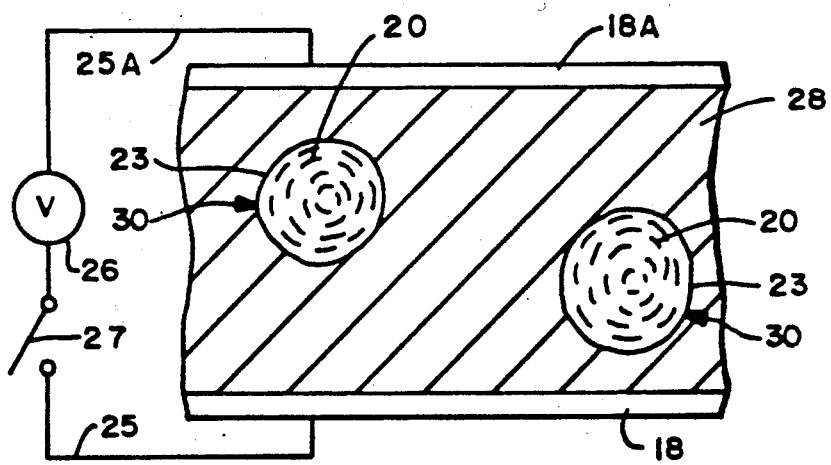
FIG.—3
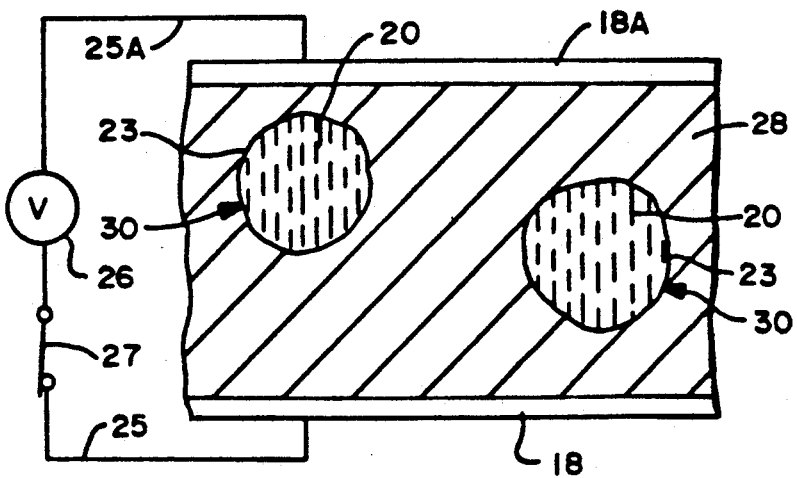
FIG.—4

LATEX ENTRAPPED NCAP LIQUID CRYSTAL COMPOSITION, METHOD AND APPARATUS

This is a continuation of application Ser. No. 705,209 filed Feb. 25, 1985 now abandoned which is a continuation-in-part of application Ser. No. 591,433, filed Mar. 20, 1984 now abandoned.

The present invention relates generally to liquid crystal, and particularly to a latex entrapped nematic curvilinearly aligned phases ("NCAP") liquid crystal. Moreover, the invention relates to methods for making such latex entrapped NCAP liquid crystal.

Liquid crystals are used in a wide variety of devices, including visual display devices. The property of liquid crystals that enables them to be used, for example, in visual displays, is the ability of liquid crystals to transmit light on the one hand and to scatter light and/or absorb it (especially when combined with an appropriate dye) on the other, depending on whether the liquid crystals are in a relatively free, that is de-energized or field-off state, or in a relatively aligned, that is energized or field-on state. An electric field selectively applied across the liquid crystals may be used to switch between the field-off and field on states.

A pleochroic dye may be present with the liquid crystal material to provide substantial attenuation by absorption in the field-off state but to be substantially transparent in the field-on state. Alternatively, an isotropic dye may be present in solution with the liquid crystal material whereby the decrease in scattering by the liquid crystal material in the field-on state does not affect the absorption of such isotropic dye. Such a formulation may generate a colored display in the field-on state but be non-transmissive in the field-off state. For the sake of convenience, any reference to the ability of liquid crystal to scatter and/or absorb light in accordance with the present invention should not be limited to the scattering and minimal absorption properties of liquid crystal but should include the additional properties pleochroic or isotropic dyes may impose on the optical properties of the liquid crystal.

There are three categories of liquid crystal material, namely cholesteric, nematic and smectic. The present invention relates in the preferred embodiment described hereinafter to the use of liquid crystal material which is operationally nematic. By "operationally nematic" is meant that, in the absence of external fields, structural distortion of the liquid crystal is dominated by the orientation of the liquid crystal at its boundaries rather than by bulk effects, such as very strong twists (as in cholesteric material) or layering (as in smectic material). Thus, for example, a liquid crystal material including chiral ingredients which induce a tendency to twist but which cannot overcome the effects of the boundary alignment of the liquid crystal material would be considered to be operationally nematic. A more detailed explanation of operationally nematic liquid crystal material is provided in co-pending U.S. Pat. application No. 477,242, filed Mar. 21, 1983 now U.S. Pat. No. 4,616,903 in the name of Fergason, entitled ENCAPSULATED LIQUID CRYSTAL AND METHOD, assigned to Manchester R&D Partnership, the disclosure of which is hereby incorporated by reference. Reference may also be made to co-pending U.S. Pat. No. application No. 302,780, filed Sept. 16, 1981, now U.S. Pat. No. 4,435,047 in the name of Fergason, entitled ENCAPSULATED LIQUID CRYSTAL AND METHOD, assigned to Manchester R & D Partnership, and which disclosure is also hereby incorporated by reference.

However, it is to be understood that the various principles of the present invention may be employed with any of the various types of liquid crystal materials or combinations thereof, including combinations with pleochroic or isotropic dyes. Therefore, reference to NCAP liquid crystal in conjunction with the composition, method and apparatus of the present invention is in no way intended to limit such composition, method or apparatus to use with nematic liquid crystal materials. It is only for convenience's sake and in an effort to use an abbreviated term that describes the composition, method and apparatus of the present invention that reference is made to NCAP liquid crystal.

Encapsulated NCAP liquid crystal and the method of making the same and devices using encapsulated NCAP liquid crystal are described in detail in the above-identified U.S. Pat. application No. 302,780 now U.S. Pat. No. 4,435,047. A NCAP liquid crystal may be made by emulsifying liquid crystal material in a solution containing an encapsulating material which may be, for example, a 22% polyvinyl alcohol (PVA) solution. Emulsified liquid crystal material may be surrounded by PVA to form capsules which are about 2 to 25 microns in diameter. This emulsion alone, or in combination with an appropriate binder, may be applied onto an electrode coated substrate. A second electrode coated substrate may be applied to the exposed surface of the NCAP liquid crystal. A functional encapsulated NCAP liquid crystal apparatus may be formed by connecting a voltage source to the electrodes.

According to the present invention, latex entrapped NCAP liquid crystal comprises the dispersion of liquid crystal material in a latex medium. Latex is a suspension of particles. The particles may be natural rubber or synthetic polymers or copolymers. A latex medium is formed by drying a suspension of such particles.

Latex is typically a suspension of particles in water or an aqueous phase. This is the preferred embodiment of the present invention. Such particles, for example synthetic polymers or copolymers, however, may also be suspended in a non-aqueous organic medium. The medium is chosen such that the integrity of the particles is maintained.

The liquid crystal material is dispersed in a latex medium where it may be more or less confined to an approximately spherical or otherwise curvilinear surface of a containment cavity. Such cavities may be discrete or interconnected by channels which may contain liquid crystal material. In the absence of an electric field, the molecules of the liquid crystal material assume a plurality of orientations and can scatter and/or absorb incident radiation from any direction. Such plurality of orientations is not due solely to the characteristic orientation of the liquid crystal molecules as observed in the neat liquid phase, but also due to the fact that the molecules are induced to conform to the shape of the containing cavities. In the absence of an electrical field, such entrapped liquid crystal molecules have a plurality of orientations with respect to incident radiation. In the presence of an electric field, the amount of scattering and/or absorption of incident radiation is reduced due to the alignment of a significant portion of the liquid crystal molecules relative to the applied field. When the electrical field is removed, the liquid crystal molecules return to the state of having a plurality of orientations induced by the containing cavities.

It is believed that latex entrapped NCAP liquid crystal material is extremely resistant to moisture and thus has enhanced stability in a humid environment. This is very desirable as any moisture that may penetrate a liquid crystal film may result in water-dependent leakage currents which may adversely affect the electro-optical performance of such liquid crystal film.

In addition, dried films of latex entrapped NCAP liquid crystal have improved adhesive properties. Improved adhesion aids in the lamination of an electrode coated substrate to the surface of such films. Such improved adhesion results in more uniform contact between the latex entrapped NCAP liquid crystal and the electrode coated substrate. As a consequence, there is improved uniformity of optical properties in an apparatus made from latex entrapped NCAP liquid crystal due to a more efficient exclusion of air from the interface between the film of latex entrapped NCAP liquid crystal and the electrode coated substrate. The adhesive properties of latex entrapped NCAP liquid crystal also result in liquid crystal devices which have increased physical durability.

Accordingly, an object of the present invention is to provide a liquid crystal composition and methods for making such a composition and apparatus incorporating such a composition wherein the composition has a high resistance to moisture.

Another object of the present invention is to provide a liquid crystal composition and methods for making such a composition and apparatus incorporating such a composition wherein the composition has improved adhesive properties resulting in increased physical durability and improved uniformity of optical properties.

Yet another object of the present invention is to provide a latex entrapped NCAP liquid crystal composition and methods for making the same and apparatus using such a composition.

Further objects of the present invention include providing methods for minimizing the solubility of liquid crystal in a latex medium, methods for increasing the stability of a mixture of a liquid crystal emulsion and a latex suspension, and simplified methods for preparing such mixtures with a high degree of control over the particle size of the discrete or interconnected cavities of liquid crystal material.

Still another object of the present invention is to provide a latex entrapped NCAP liquid crystal composition wherein the latex has undergone cross-linking.

In accordance with the present invention, a liquid crystal material may be emulsified by agitating it in an aqueous phase to form emulsified liquid crystal material. The liquid crystal emulsion is then mixed with a suspension of latex particles. Alternatively, the liquid crystal material and latex particles may be combined in an aqueous phase followed by emulsification of the liquid crystal material to form a mixture of emulsified liquid crystal particles and suspended latex particles. Either of these mixtures may then be dried to form a latex medium with the particles of liquid crystal dispersed throughout the latex medium.

The latex medium comprises a containment means for inducing a generally distorted alignment of the liquid crystal material which in response to such alignment at least one of scatters and/or absorbs light and which in response to a prescribed input reduces the amount of such scattering and/or absorption.

A cross-linking producing material may be utilized to effect cross-linking of the latex.

In the case of a liquid crystal apparatus, the combined liquid crystal emulsion-latex suspension would ordinarily be layered onto an electrode coated substrate followed by drying to form a latex medium. A second electrode coated substrate would then be to the exposed surface of the latex medium and both electrode coated substrates would be connected to an appropriate voltage source. The liquid crystal emulsion-latex suspension may, however, be applied to an surface appropriate for its ultimate use.

Additional features of the invention will be evident from the following description taken in conjunction with the accompanying drawings wherein:

FIG. 1 is a schematic view illustrating a liquid crystal apparatus.

FIG. 2 is a schematic view illustrating a composition made in accordance with the present invention prior to drying.

FIG. 3 is a schematic view illustrating an apparatus cast with a composition made in accordance with the present invention in the absence of an electric field.

FIG. 4 is a schematic view illustrating an apparatus cast with composition made in accordance with the present invention in the presence of an electric field.

Referring now to the drawings, attention is first directed to FIG. 1. FIG. 1 shows a NCAP liquid crystal apparatus indicated generally by reference numeral 10 as disclosed in U.S. Pat. application No. 302,780. The apparatus includes a NCAP liquid crystal 11 supported on a substrate 12 having an electrode 13 located thereon. The apparatus also comprises a second electrode 14 mounted on substrate 15. For the sake of convenience, substrate 12 and electrode 13 may also be referred to as electrode coated substrate 18, and, similarly, substrate 15 and electrode 14 will be referred to as electrode coated substrate 18A.

The encapsulated NCAP liquid crystal 11 includes a liquid crystal material 20 more or less contained within the confines of the interior volume 21 of a capsule 22.

A voltage may be applied to electrode coated substrates 18 and 18A and hence across liquid crystal 11 from an AC or DC voltage source 16. Voltage source 16 is connected to electrode coated substrates 18 and 18A by electrical leads and through selectively closeable switch 17. When switch 17 is closed, a voltage is applied across electrode coated substrates 18 and 18A causing the liquid crystal molecules to align with the field thereby becoming optically transmissive. When switch 17 is open and no voltage is applied, the liquid crystal scatters and/or absorbs light.

Mounting substrates 12 and 15 and electrodes 13 and 14 may be optically transparent so that the liquid crystal apparatus 10 is capable of controlling the transmission of light therethrough in response to an electric field applied across electrode coated substrates 18 and 18A. Alternatively, electrode coated substrate 18 may be optically reflective or may have thereon an optically reflective coating so that reflection by such reflective coating of incident light will be a function of whether there is an electric field applied across the liquid crystal 11.

FIG. 2 illustrates a thin layer of an undried mixture 19 obtained when liquid crystal material 20 is combined with a suspension of latex particles 24 in accordance with the present invention. It is known to those skilled in the art that there is a wide variety of materials from which liquid crystal 20 in mixture 19 may be chosen. This degree of choice also exists within the nematic category of liquid crystal. As a consequence and as discussed heretofore, this invention is not limited to any category of liquid crystal or to any specific material.

It is also known to those skilled in the art of paint formulation that there is a great number of compositions with which latex particles, such as those in mixture 19, may be made. This invention, therefore, is not limited to the particular latex compositions disclosed but rather extends to any latex formulation which may be used to entrap liquid crystal material.

The choice of liquid crystal and latex particles will depend upon a variety of physical properties for each material. One of the most basic considerations is the solubility of the liquid crystal material in the latex particles. In general, the solubility of the liquid crystal material in the latex particles should be less than about 20% of the initial volume of liquid crystal material. If the liquid crystal is relatively insoluble in the latex, a dispersion of discrete liquid crystal particles in latex medium may be formed. Such compositions are highly efficient in scattering and/or absorbing light in the field-off state but are optically transmissive in the field-on state.

The solubility parameter of the liquid crystal and latex particles may be used as an initial guide in selecting the materials to be used in formulating the latex entrapped NCAP liquid crystal composition.

The solubility parameter δ can be calculated from the following equation:

$$\delta = \frac{D(\Delta H_v - RT)^{\frac{1}{2}}}{M}$$

where D is density of the material, $\Delta H_v$ is the heat of vaporization, T is the temperature in degrees Kelvin, M is the molecular weight of the compound, and R is the gas constant. The units of δ are $(cal/cm^3)^{\frac{1}{2}}$ but for convenience are designated as the Hildebrand unit (H). An alternate method of calculating the solubility parameter is based on the use of molar attraction constants (G) measured at an appropriate temperature:

$$\delta = \frac{D\Sigma G}{M}$$

where Σ G is the sum of the various G values of the groups comprising a particular molecule.

The solubility parameter of latex polymers range from about 6H to about 16H. The solubility parameter of typical liquid crystal material ranges from about 12H to about 13H although the range may extend from about 10H about 15H. At temperatures below about 50° Centigrade, nonpolar liquids, such as the liquid crystal material used in liquid crystal display devices, are miscible with nonpolar polymers when their solubility parameters differ by about 2H units or less. If the liquid crystal material has a solubility parameter of about 12H, it can be determined initially that latex particles with solubility parameters below 10H or greater than 14H should be capable of forming latex entrapped NCAP liquid crystal. Examples of groups of latex polymers with solubility parameters below 10H include polyethylenes, polypropylenes, polyurethanes, polyacrylics and polysiloxanes. An example of a latex polymer with a solubility parameter greater than 14H is polyacrylonitrile, which has a solubility parameter of 15.4H. Groups of latex copolymers with solubility parameters less than about 10H include methacrylate-acrylonitriles, urethane-acrylics, acrylate-acrylonitriles, styrene-acrylonitriles and vinylidene chloride-acrylonitriles. These groups of latex polymers and latex copolymers include the unsubstituted polymer and copolymer as well as the wide variety of polymers and copolymers obtained by substituting various functional groups in the monomers used to make such polymers and copolymers.

If the theoretical solubility parameters of the liquid crystal and the latex particles are closely matched, it would be expected that the liquid crystal may dissolve in the latex particles and become isotropic in the latex medium. Films of such liquid crystal and latex are unlikely to demonstrate a high degree of light scattering and/or absorption in the field-off state. It would also be expected that the latex may concurrently dissolve in the liquid crystal material. Such solubility may adversely affect the operationally nematic character of the liquid crystal depending on the extent of such solubility and the chemical and physical properties of the latex polymer dissolved. Moreover, the dissolution of liquid crystal into latex and latex into liquid crystal may be expected to adversely affect the properties of the latex medium formed upon drying.

It has been observed experimentally, however, that latex entrapped NCAP liquid crystal compositions may be made by the methods of the present invention even if the theoretical solubility parameters of the liquid crystal material and latex particles are close to each other. This would indicate that the use of solubility parameters should only be considered as a guide in choosing the liquid crystal material and latex particles. It is not understood why latex entrapped NCAP liquid crystal compositions may be made with liquid crystal material and latex particles having closely matched solubility parameters. However, such latex entrapped NCAP liquid crystal compositions generally have electro-optical properties which are temperature sensitive. For example, as the temperature is varied, the brightness, color and saturation voltage may vary. It is believed that these properties are dependent upon and change with the particle size of the latex entrapped NCAP liquid crystal which in turn may be dependent upon the solubility parameters of the liquid crystal material and the latex particles at a given temperature. If the solubility parameters are closely matched, the resulting latex entrapped NCAP liquid crystal composition may demonstrate temperature sensitive electro-optical properties which may be irreversible and consequently undesirable.

Accordingly, the theoretical solubility parameters of liquid crystal and latex particles may be used to select components for a latex entrapped NCAP liquid crystal composition when the solubility parameters differ by more than 2H units. If the difference in solubility parameters is less than 2H units, the choice of liquid crystal and latex particles may be based on an empirical determination that the liquid crystal material and latex particles chosen can produce a functional latex entrapped NCAP liquid crystal composition in accordance with the present invention.

The choice of surfactant which may be necessary to generate an emulsion of liquid crystal particles in an aqueous phase is also an important consideration. A surfactant generally contains molecules with hydrophilic and lypophilic regions within the same molecule. In forming an emulsion of liquid crystal particles in an aqueous phase, the lypophilic region of the surfactant interacts with the liquid crystal material and the hydrophilic region of the surfactant interacts with the aqueous phase. As a consequence of such lypophilic and hydrophilic interactions, a stable emulsion of liquid crystal particles in an aqueous phase may be formed. In addition, the liquid crystal particle size in such emulsions may be controlled by the amount and chemical characteristics of the surfactant used for emulsification.

Since the optical performance of an apparatus using latex entrapped NCAP liquid crystal is dependent upon the particle size of the dispersed liquid crystal material, the amount and choice of surfactant used for emulsifying the liquid crystal material may be used to control the electro-optical properties of such latex entrapped NCAP liquid crystal compositions.

The amount of surfactant used for emulsifying the liquid crystal material, however, should be the minimal amount needed to stabilize the liquid crystal emulsion and to control the liquid crystal particle size in such an emulsion. A surfactant interacts with the liquid crystal material. The extent of such interaction is greatest when the lypophilic region of the surfactant is chemically similar to the liquid crystal material. Such interactions lower the temperature at which an operationally nematic liquid crystal material will become isotropic (i.e. the clearing point temperature). Excessive depression of the clearing point temperature by use of an excessive amount of surfactant may render a particular latex entrapped NCAP liquid crystal composition useless for its intended purpose. A minimal amount of surfactant should therefore be used to minimize depression of the clearing point temperature of the particular liquid crystal material used.

A useful guide in choosing a surfactant for a particular application relates to the lypophile-hydrophile balance coefficient (hereinafter "HLB coefficient") of the surfactant. The HLB coefficient reflects the solubility of a substance in oil or water. An HLB coefficient less than about 9 indicates that the surfactant has lypophilic characteristics. An HLB coefficient greater than about 12 indicates that the surfactant has hydrophilic characteristics. Since the emulsification of a liquid crystal material in an aqueous phase is similar to the formation of an oil in water emulsion, surfactants with an HLB coefficient between about 12 and 17 may be required to emulsify a liquid crystal material in an aqueous phase.

For a particular application, the optimal HLB coefficient of the surfactant may be determined by experiment. Generally, the optimal HLB coefficient may be determined by observing the extent and stability of an emulsion of liquid crystal material in an aqueous phase as a function of a surfactant's HLB coefficient. The HLB coefficient is, however, only one parameter which may be considered in choosing an appropriate surfactant.

Even though a surfactant may have an HLB coefficient close to the experimentally determined optimal HLB coefficient, the amount of surfactant needed for emulsification may be related to the chemical characteristics of the surfactant. Since it is desirable to minimize the amount of the surfactant used, surfactants from different chemical classes with HLB coefficients close to the experimentally determined optimal HLB coefficient may be chosen to experimentally determine for each chemical class the minimal amount of surfactant needed to practice the present invention. The preferred surfactant may then be chosen based on these results. When a combination of surfactants is desirable this method may also be used to determine which combination of surfactants maximizes the stability and control of particle size of an emulsion of liquid crystal material while minimizing the amount of surfactant used. A further consideration in choice of liquid crystal and latex particles relates to matching the indices of refraction to maximize contrast between the field-on and field-off states. Because the index of refraction of a material is generally strain-dependent and since strain may be induced in latex entrapped NCAP liquid crystal, it may be necessary to consider this effect in matching the indices of refraction of the liquid crystal material and latex medium. If the index of refraction of the latex medium is not closely matched to the ordinary index of refraction of the liquid crystal material (i.e., the index of refraction in the field-on state), incident radiation may be refracted in the field-on state resulting in decreased transmission due to scattering and/or absorption. The closeness of the index matching will be dependent on the desired degree of contrast and transparency in the device, but the ordinary index of refraction of the liquid crystal and the index of refraction of the latex medium will preferably differ by no more than 0.05, more preferably 0.03, especially 0.01.

When no field is applied, there may be a difference in indices of refraction at the boundary of the liquid crystal and the latex medium due to the extraordinary index of refraction of the liquid crystal (i.e. the index of refraction in the field-off state). This may cause refraction at the interface or boundary and thus enhance scattering and/or absorption. It is thus desirable to choose liquid crystal material with an ordinary index of refraction matching the index of refraction of the latex medium and an extraordinary index of refraction which differs from the index of refraction of the latex medium.

Another important consideration in the choice of liquid crystal and latex particles relates to their electrical properties. Liquid crystal apparatus are desirable because they operate with low power requirements. To maintain this feature, a latex entrapped NCAP liquid crystal apparatus should contain a latex medium which has a dielectric constant which is greater than the dielectric coefficient of the liquid crystal in the absence of an electric field. In addition, the extraordinary dielectric coefficient of the liquid crystal should be matched as closely as possible to the dielectric constant of the latex medium. The efficiency of the electro-optical performance is enhanced when the liquid crystal material has a positive dielectric anisotropy and the ordinary dielectric coefficient is less than the dielectric constant of the latex medium.

When the liquid crystal is substantially aligned with the electric field, the matching of the extraordinary dielectric coefficient of the liquid crystal with the dielectric constant of the latex medium results in maximum light transmission in the field-on state due to the minimal distortion of the electric field. If such dielectric constant and such extraordinary dielectric coefficient are not closely matched, the liquid crystal material may not be aligned directly with the external electric field due to distortion of the field lines within the latex entrapped NCAP liquid crystal composition. Such lack of alignment may result in scattering of the light passing therethrough and reduce the amount of light transmitted.

In addition, the latex medium should have a relatively large impedance to ensure that a maximum voltage drop occurs across the liquid crystal material and to prevent short circuits through the latex medium which may bypass the liquid crystal resulting in decreased electro-optical efficiency.

Once the liquid crystal and latex particles are chosen the mixture 19 may be made according to the following methods.

The liquid crystal may be first emulsified by agitating the liquid crystal in an aqueous solution. Typically, the amount of liquid crystal ranges from about 30% to about 60% of the total emulsion volume. Surfactants and/or protective colloids are preferably required to generate and maintain the liquid crystal emulsion. Generally, the amount of surfactant may be between about 0.1 wt. % to about 6.0 wt. %, preferably less than 3 wt. %, and the protective colloids may be present at about 0.1 wt. % to about 10 wt. % of the total wet emulsion. Surfactants which may be used include but are not limited to TWEEN 20 or TWEEN 21 (available through ICI Americas, Inc., Wilmington, Delaware), IGEPAL CO-730 (available through GAF Corp., New York, New York). Protective colloids may include but are not limited to PVA, GANTREZ, (available through GAF Corp., New York, New York), and polyethyleneoxide (PEO). Agitation to form the emulsion may be performed in a colloid mill, a high speed disperser or other devices known to those skilled in the art. The agitation is terminated when the emulsified liquid crystal particles have a diameter from about 1 micron to about 10 microns, and preferably 2-5 microns.

This emulsion and 1-3 volumes of a suspension of latex particles which range in size from about 0.01 microns to about 1.0 microns and comprising about 20% to about 60% of the suspension volume is slowly combined with constant mixing. The mixture 19 may then be layered onto an electrode coated substrate 18 (see FIG. 3) and dried to generate a solid latex medium 28 with entrapped liquid crystal 20 dispersed therein.

An alternate method is to simply add all of the components together, and emulsify the liquid crystal directly into the latex. This method has the advantage of ease in processing, but some of the control over particle size may be sacrificed.

Additional additives may be used. Such additives may include wetting agents, leveling agents, ultra-violet (uv) stabilizers, anti-oxidants, heat stabilizers, pH stabilizers, adhesion promoters, and agents to modify the indices of refraction and/or electrical properties of the composition.

A uv stabilizer helps to prevent the "yellowing" of liquid crystal, that is, a change from clear or white to yellow in color. It also protects the latex polymer from uv light. An example of a uv stabilizer that improves solar stability is Tinuvin 328 (available through BASF Wayandotte, Parsippary, N.J.).

Pleochroic dyes such as Oil Blue N, Sudan black, Sudan III and Sudan II (all available through Aldrich Chemical Co., Milwaukee, WI.) may also be employed in the general method. Generally, such dyes are dissolved in the liquid crystal prior to emulsifying the liquid crystal in an aqueous phase. Such dyes are typically about 0.5 wt. % to about 6 wt. % of the liquid crystal material. Isotropic dyes such as copper phthalocyanine may also be used in quantities ranging from about 0.5 wt. % to 6 wt. % of the liquid crystal material.

In addition, PVA may also be used as a protective colloid in the above-described general method. The amount of PVA used may be about 0.1% to about 10% of the emulsion volume. Generally, the PVA is combined with an aqueous solvent, liquid crystal material and surfactant prior to agitation to form the liquid crystal emulsion. It has been observed that smaller liquid crystal particles may be obtained when PVA is used in conjunction with the methods for making latex entrapped NCAP liquid crystal. In the absence of PVA, entrapped liquid crystal particles range in size from about 2 to about 15 microns. When PVA is used, particle size ranges from about 1 to 5 microns. It is believed that the PVA acts as a protective colloid which stabilizes the emulsion, and as a thickening agent which increases the viscosity thereby allowing greater shearing force during emulsification.

EXAMPLE 1

A method for making latex entrapped NCAP liquid crystal may comprise first emulsifying 36 grams of the liquid crystal ROTN701 (available through Hoffman La Roche, New York, New York) in a solution containing 14 grams of a 12% aqueous solution of polyvinylalcohol (PVA) and 1 gram of the surfactant TWEEN 20. The liquid crystal is added continuously while the solution is mixed with an impeller blade at 3500 RPM. When the particle size of the liquid crystal is about 1-5 microns, 49 grams of Neorez R-967 (available through Polyvinyl Chemicals, Wilmington, Mass.) containing 40% of latex particles by weight is added with slow mixing of less than 1000 RPM until the mixture is homogenous. This material may then be layered with a knife blade or other suitable means onto an appropriate substrate and dried.

EXAMPLE 2

In an alternative method, 25 grams of ROTN701 liquid crystal, 0.5 grams of TWEEN 20 and 74.5 grams of Witcobond W-212 (available through Witco Chemicals, Organic Division, New York, New York) containing 30% of latex particles by weight may be combined and mixed with an impeller blade at 3500 RPM until the liquid crystal particles are about 1-5 microns in diameter. This material may then be used in making a liquid crystal apparatus.

FIG. 3 is a schematic side view of the liquid crystal apparatus incorporating latex entrapped NCAP liquid crystals such as those made in accordance with Examples 1 or 2. Liquid crystal 20 is entrapped by latex medium 28 to form particles 23 of liquid crystal dispersed throughout the latex medium. Electrode coated substrates 18 and 18A contact the opposite faces of the latex entrapped NCAP liquid crystal and are connected by leads 25 and 25A, respectively, to voltage source 26. When switch 27 is open no voltage is applied to the entrapped liquid crystal and the molecules of liquid crystal, depicted as dashed lines, are shown to conform to the shape of cavity 30 containing the liquid crystal particles. An array of such molecules will scatter and/or absorb light from all directions since the liquid crystal material as a whole has a random orientation.

When switch 27 is closed as shown in FIG. 4, the electric field causes the molecules of the liquid crystal to align in relation to the electric field. This ordering allows the latex entrapped liquid crystal to transmit light. When switch 27 is opened, the liquid crystal returns to the orientation depicted in FIG. 3. Response times for the alignment and relaxation of liquid crystal in an electric field are typically on the order of a few milliseconds. A more detailed explanation of this phenomenon may be found in the above-identified U.S. Pat. application No. 302,780 which is specifically incorporated by reference here.

Latex entrapped liquid crystal has a demonstrated resistance to moisture. For example, emulsified ROTN-701 liquid crystal and polyurethane latex particles were layered onto a 5 mil thick polyester film coated with a 500 ohms per square conductive layer of indium tin oxide (ITO) to form a latex entrapped NCAP liquid crystal composition approximately 0.7 mil thick. A second layer of 5 mil thick polyester film coated with a 500 ohms per square conductive layer of ITO was laminated onto the exposed latex entrapped NCAP liquid crystal composition after the composition was dried. The edges were not sealed. The apparatus was exposed to 95% humidity at 40° Centigrade for 10 days. There was no degradation as measured by a change in the contrast of the apparatus. Moreover, there was very little increase in moisture dependent leakage current. Similar result are obtained when such apparatus are exposed to steam for one hour.

In addition, the improved adhesive properties of latex entrapped NCAP liquid crystal composition facilitate the construction of the apparatus of the present invention. Specifically, the adhesion of such compositions to substrates 18 and 18A results in improved lamination of substrate 18A onto the surface of a dried film of a latex entrapped NCAP liquid crystal composition. Such lamination may be achieved by contacting electrode coated substrate 18A to the surface of dried film of latex entrapped NCAP liquid crystal which has been cast on substrate 18. The point of contact between the dried film of latex entrapped NCAP liquid crystal may be between two rollers which apply an appropriate compressive force as substrate 18A and the dried film of latex entrapped NCAP liquid crystal composition are drawn therethrough. Such improved lamination results in improved contrast due to a more efficient exclusion of air from the interface between the liquid crystal film and the substrate 18A.

To explain more fully, air has an index of refraction ($n \approx 1$) that is different from the polyester substrate 12 or 15 ($n \approx 1.67$), the latex medium 28 ($n \approx 1.5$), and the indium tin oxide electrode 13 or 14 ($n \approx 2.0$). Such a mismatch in indices of refraction causes light incident on apparatus 10 to scatter, adversely affecting the contrast of the apparatus when it is in an energized or field-on state. It has been found that the elimination of air from the interface of the electrode coated substrate 18A and the latex entrapped liquid crystal composition decreases the scattering of light, when the apparatus is in an energized state thus greatly enhancing the uniformity of its optical properties.

The improved adhesive properties of the latex entrapped NCAP liquid crystal composition permit a display device to be fabricated without edge seals about the periphery of the device and without the use of spacers between electrode coated substrates, as was required with certain liquid crystal display devices known heretofore. Such features of the present invention greatly facilitate as well as reduce the cost of processing liquid crystal display apparatus.

The latex entrapped NCAP liquid crystal is extremely resistant to moisture and has enhanced adhesive properties. As such, its electro-optical performance and durability are enhanced. The longevity of a liquid crystal display is also improved. The display is more able to resist certain external environmental factors such as water, humidity, dirt, and chemicals. Additionally, certain latex materials, such as polyurethanes, are very stable in ultra-violet light.

The addition of a cross-linking producing material to the latex entrapped NCAP liquid crystal composition further improves the moisture resistance and adhesion characteristics of the composition, and thus, the composition's physical durability and electro-optical performance. A cross-linking agent improves the tensile strength of the latex-liquid crystal matrix, and also reduces the degree of swelling of the latex material. A cross-linking agent in effect forms a harder polymer skelton.

The particular cross-linking agent utilized is specific to the latex polymer of the composition. The cross-linking agent obviously must be one that sets-up the appropriate chemical links between the molecular chains of the polymer; that is, it reacts with known functional groups of the particular latex polymer. Preferably, the degree of cross-linking (cross-linking density) should be at or slightly beyond the point where the polymer gels. The cross-linking agent is soluble in the latex polymer. However, it should not react with nor be soluble in the liquid crystal material; that is, it does not react with known functional groups of the particular liquid crystal material. The cross-linking agent should be one that does not degrade the electro-optical properties of the liquid crystal, such as by causing "yellowing" of the liquid crystal.

Examples of various materials that show an ability to cross-link with neorez R-967 (available through Polyvinyl Chemicals Wilmington, Ma. and containing 40% of latex particles by weight) include the following:

| Trade Name | Manufacturer | Type/Class | Cure |
|---|---|---|---|
| CX100 | Polyvinyl Chemicals Wilmington, Ma. | Aziridine | Room Temp. |
| Cymel 373 | American Cyanamid Industrial Parks Div. Wayne, N.J. | Partially alkylated melamine resin | acid catalyzed & heat |
| Cymel 1171 | American Cyanamid Industrial Parks Div. Wayne, N.J. | Methylated-ethylated glycouril resin | acid catalyzed & heat |
| Cymel 1172 | American Cyanamid Industrial Parks Div. Wayne, N.J. | Tetramethylol glycouril resin | acid catalyzed & heat |
| Bettle 655 | American Cyanamid Industrial Parks Div. Wayne, N.J. | Partially methylated urea-formaldehyde resin | acid catalyzed & heat |
| XW | Witco Chemicals N.Y., N.Y. | Epoxy resin | Heat |
| Tyzor LA | DuPont Wilmington, Del. | Lactic acid chelate (titanate) | Heat |

THe aziridine is highly carcinogenic and therefore undesirable. The epoxy resin yellowed in environmental testing (ultra-violet light). The titanate showed no degradative results. Testing of the above was performed with 40% Cyano liquid crystal material.

EXAMPLE 3

A method for making entrapped NCAP liquid crystal may comprise dissolving 1.16 grams of the surfactant Igepal C0720 (available through GAF, New York, New York) into 73.36 grams of the liquid crystal ROTN 605 (available through Hoffman La Roche, New York, New York) in a 400 ml. beaker. 110 grams of Neorez R-967 (available through Polyvinyl Chemicals) containing 40% of latex particles by weight is added with mixing at approximately 1500 RPM for 5 minutes and 2000 RPM for 2 minutes, using a 1.5 inch low pitch impeller. Thereafter, 14.48 grams of a 5% solution of the cross-linking agent Tyzor LA is added with slow mixing at about 300 RPM. This composition may be layered onto an appropriate electrode coated substrate and dried.

Alternatively, the cross-linking agent may be mixed with the latex prior to adding the liquid crystal.

The composition of Example 3 was coated onto a Mylar ® film with a precoated indium tin oxide (ITO) electrode known as Intrex, which may be purchased from Sierracin of Sylmar, Ca. Intrex was also laminated to the other side of the composition. The structure was then heated with a heat gun (forced air) to 100° C. for 1–2 seconds.

This apparatus was tested against a non-cross-linked latex entrapped NCAP liquid composition apparatus constructed in the same fashion. The non-cross-linked composition was formulated as called for in Example 3, except that 7.24 grams of deionized water was added in place of the cross-linking agent Tyzor LA. The results of this comparison are shown in Table I.

TABLE I

Environmental results of Cross-link vs. Non-cross-link Percent change after 100 hours.

| Environmental Condition | Parameter | Non-Cross-Linked | Cross-Linked |
|---|---|---|---|
| 70° C./85% RH 60 volts (applied voltage) | $V_{sat}$ | −25% | −5% |
| | Brightness | −29% | −8% |
| | Contrast | no change | −10% |
| 70° C./85% RH passive (no applied voltage) | $V_{sat}$ | −32% | −7% |
| | Brightness | −37% | −7% |
| | Contrast | +25% | −15% |
| 70° C./dry oven 60 volts | $V_{sat}$ | no change | no change |
| | Brightness | −38% | no change |
| | Contrast | +2% | no change |
| 70° C./dry oven passive | $V_{sat}$ | +25% | no change |
| | Brightness | −34% | +5% |
| | Contrast | +9% | no change |
| Solar Passive (roof) | $V_{sat}$ | +100% | +10% |
| | Brightness | −2% | −15% |
| | Contrast | −28% | −6% |

The temperature (70° C.) was provided by testing the devices in an oven. 60 volts was applied in the active mode, and the devices were off in the passive mode. The saturation voltage ($V_{sat}$) was measured at 90% of saturation. Brightness and contrast were measured using a Photodyne Model 99XL Densitometer/Reflectometer. Brightness was measured against an 18% gray card standard (Kodak). Contrast was measured as the ratio of brightness off minus brightness on to brightness off.

The percent change in the parameters was measured over 100 hours without the application of any sort of stress to the devices under test. A substantial decrease in either brightness or contrast, is undesirable. An increase in saturation voltage is also undesirable.

Delayed cross-linking agents may be utilized in the context of the present invention. A delayed cross-linking agent is one that is not that reactive at room temperature. It cross-links at room temperature but only over a relatively long period of time, for example, 2–3 months. The reaction of a delayed cross-linking agent may be accelerated by an increase in temperature or ultra-violet light, or a change in pH. Tyzor LA may be used as a delayed cross-linking agent.

Delayed cross-linking agents would facilitate the use of "soft" polymers. A "soft" polymer is a polymer which is above the glass transition temperature. An example of a "soft" polymer is amorphous styrene-butadiene (25/75) copolymer (glass transition temperature −60° C.). "Soft" polymers would enhance processing as they are good film formers and are more adhesive than "hard" polymers and thus easier to laminate. In addition, since "soft" polymers have better adhesive properties than "hard" polymers, they would offer even more exclusion of air from the interface of the liquid crystal composition and the electrode-coated substrates. Then, once the device has been constructed, heat may be applied to activate the delayed cross-linking agent so as to harden the "soft" polymer, thereby increasing the physical durability of the device.

Having described a preferred embodiment of the present invention, it will occur to those ordinarily skilled in the art that various modifications may be made to the disclosed embodiment, and that such modifications are intended to be within the scope of the present invention.

What is claimed is:

1. A composition comprising a suspension of latex particles in an aqueous medium wherein said latex particles are insoluble in said medium and an operationally nematic liquid crystal material dispersed in said medium wherein said medium after it has dried induces a generally distorted alignment of said liquid crystal material which in response to said alignment at least one of scatters and absorbs light and which in response to a prescribed input reduces the amount of such scattering or absorption.

2. The composition of claim 1 further including a surfactant and/or a protective colloid.

3. The composition of claim 2 wherein said surfactant has a HLB coefficient ranging from about 12 to about 17.

4. The composition of claim 1 wherein said liquid crystal material occupies about 20% to 60% of the volume of said composition.

5. The composition of claim 1 wherein said liquid crystal material is dispersed in said medium as particles having a diameter from about 1 micron to about 10 micron.

6. The composition of claim 1 further including a dye dissolved in said liquid crystal material.

7. The composition of claim 1 wherein said medium and said liquid crystal material have solubility parameters which different by at least two Hildebrand units.

8. The composition of claim 7 wherein said medium has a solubility parameter from about 6H to about 16H and said liquid crystal material has a solubility parameter from about 10H to about 15H.

9. The composition of claim 1 wherein said liquid crystal material has minimal solubility in said medium.

10. The composition of claim 9 wherein said minimal solubility of said liquid crystal material in said medium is less than about 20% of the initial volume of said liquid crystal material.

11. The composition of claim 1 wherein said latex particles include a copolymer with one of the polymer constituents being a urethane.

12. The composition of claims 1, 2, 3, 4, 5, 6, 7, 8, 9 or 10 wherein said medium after it has dried and said liquid crystal material have substantially matched indices of refraction in the presence of said prescribed input.

13. The composition of claims 1, 2, 3, 4, 5, 6, 7, 8, 9 or 10 wherein said medium after it has dried has a dielectric constant which is greater than the dielectric coefficient of said liquid crystal material in the absence of an electric field and wherein said medium has a dielectric constant substantially matching the extraordinary dielectric coefficient of said liquid crystal material in the presence of an electric field.

14. The composition of claim 1 wherein said liquid crystal material and said medium after it has dried have substantially related dielectric constants in the presence of an electric field such that there is a greater voltage drop across said liquid crystal material than across said medium.

15. A liquid crystal apparatus, comprising an operationally nematic liquid crystal material and a containment medium formed from a suspension of latex particles in an aqueous medium wherein said latex particles are insoluble in said aqueous medium, said containment medium inducing a generally distorted alignment of said liquid crystal material which in response to such alignment at least one of scatters and absorbs light and which in response to a prescribed input reduces the amount of such scattering and absorption.

16. The composition of claim 15 wherein said liquid crystal material and said containment medium have substantially matched indices of refraction in the presence of said prescribed input.

17. The liquid crystal apparatus of claim 15 wherein said prescribed input is an electric field, and said liquid crystal material and said containment medium have substantially related dielectric constants in the presence of said electric field such that there is a greater voltage drop across the liquid crystal material than across said containment medium.

18. The liquid crystal apparatus of claim 17 further including electrode means for applying said electric field to said liquid crystal material.

19. The liquid crystal apparatus of claim 18 further including substrate means for supporting the combination of said liquid crystal material and said containment medium, and said electrode means.

20. The liquid crystal apparatus of claim 19 further including circuit means for energizing said electrode means to apply said electric field.

21. The liquid crystal apparatus of claim 15 wherein said liquid crystal material contains a dye.

22. The liquid crystal apparatus of claim 15 wherein said containment medium forms discrete curved volumes containing discrete quantities of said liquid crystal material, and said generally distorted alignment comprises alignment at least partially paralleling the curvature of said volumes.

23. The composition of claim 1, 5 or 9 wherein said particles have undergone crosslinking.

24. The composition of claim 23 wherein said cross-linking producing material and said liquid crystal material are selected such that the solubility of said cross-linking material in said liquid crystal material and the reactivity therebetween are minimized.

25. The liquid crystal apparatus of claim 15 wherein a cross-linking producing material is added to said aqueous medium to effect cross-linking of said latex particles.

26. The liquid crystal apparatus of claim 25 wherein said cross-linking producing material and said liquid crystal material are selected such that the solubility of said cross-linking material in said liquid crystal material and the reactivity therebetween are minimized.

27. An entrapped liquid crystal composition comprising a containment medium that is formed by a suspension of latex particles in an aqueous medium wherein said latex particles are insoluble in said aqueous medium and an operationally nematic liquid crystal material dispersed in said containment medium, wherein said containment medium induces a generally distorted alignment of said liquid crystal material which in response to said alignment at least one of scatters and absorbs light and which in response to a prescribed input reduces the amount of such scattering or absorption.

28. The composition of claim 27 wherein said latex particles are cross-linked.

29. The composition of claim 28 wherein a cross-linking producing material and said liquid crystal material are selected such that the solubility of said cross-linking material in said liquid crystal material and the reactivity therebetween are minimized.

30. The composition of claim 23 wherein a cross-linking producing material is selected from the group consisting of:
partially alkyklated melamine resin, methylated ethylated glycerol resin, tetramethylol glycerol resin, partially methylated ureaformaldehyde resin, and titanate.

31. The composition of claim 28 wherein a cross-linking producing material is selected from the group consisting of:
partially alkylated melamine resin, methylated ethylated glycerol resin, tetramethylol glycerol resin, partially methylated ureaforaldehyde resin, and titinate.

* * * * *